United States Patent [19]

Carney et al.

[11] Patent Number: 5,303,392
[45] Date of Patent: Apr. 12, 1994

[54] ACCESSING CURRENT SYMBOL DEFINITIONS IN A DYNAMICALLY CONFIGURABLE OPERATING SYSTEM

[75] Inventors: Michael W. Carney, Merrimacport, Mass.; William Shannon, Los Altos, Calif.; Joseph E. Provino, Cambridge, Mass.

[73] Assignee: Sun Microsystems, Inc., Mountain View, Calif.

[21] Appl. No.: 843,938

[22] Filed: Feb. 27, 1992

[51] Int. Cl.$^5$ .................................. G06F 9/00
[52] U.S. Cl. ............................................. 395/775
[58] Field of Search ............................ 395/700, 775

[56] References Cited

U.S. PATENT DOCUMENTS 4,636,940 1/1987 Goodwin, Jr. ...................... 395/700

Primary Examiner—Robert L. Richardson
Attorney, Agent, or Firm—Blakely Sokoloff Taylor & Zafman

[57] ABSTRACT

In a computer system executing a dynamically configurable operating system, a symbol definition image file builder is provided for building a symbol definition image file real time for utilities and application programs. The symbol definition image file is built upon receipt of an open request for the file and a current system definition image file does not exist. The symbol definition image file is deleted upon receipt of a close request for the file and it is determined that the file is no longer referenced and non-current. The symbol definition image file comprises all current symbol definitions and strings of the operating system. The current symbol definitions and strings are gathered by the symbol definition builder from the symbol and string tables of the root executable segment and the relocatable segments of the operating system that are currently loaded in memory. Additionally, prior to building the symbol definition image file, the symbol definitions image file builder inhibits automatic unloading of the relocatable segments until all accesses to the symbol definition image file are completed, thereby protecting the symbol definitions and the strings that are included in the symbol definition image files from becoming stale.

13 Claims, 6 Drawing Sheets

ACCESSING CURRENT SYMBOL DEFINITIONS IN A DYNAMICALLY CONFIGURABLE OPERATING SYSTEM

BACKGROUND OF THE INVENTION

1. Field of the Invention

The present invention relates to the field of computer systems and their operating systems, in particular, computer systems executing the UNIX ® system (UNIX is a registered trademark of UNIX System Laboratories, Inc.). More specifically, the present invention relates to providing access to symbolic definitions in a dynamically configurable operating system, in particular, the kernel of a UNIX ® system.

2. Background

Traditionally, many operating systems including the kernel of the UNIX ® system are pre-built as one executable image, that is all program segments of the operating system are statically linked, resolving all symbolic references to the symbolic definitions. Typically, under this approach, a file containing a symbol table comprising entries of all symbolic definitions is available on disk for any utility or application program that needs access to the information.

While the pre-built single executable image operating system is often tailorable, special knowledge and skill are usually required. As a result, experience has shown that most computer systems simply use the generic version even though many functions included in the generic version are not used, thereby wasting memory resources.

Today, some operating systems including the kernel of some UNIX ® systems are configured dynamically. Under a fully dynamically reconfigurable operating system, the functions offered by the operating system are distributed over a root executable segment and a number of relocatable segments. The root executable segment is loaded and given control during system startup. The functions distributed in the relocatable segment are dynamically loaded and linked on an as needed basis. In the event of memory constraint, some dynamically loaded and linked relocatable segments that have not been used recently may even be overlaid. As a result, the symbol definitions available at any particular point in time change dynamically. Thus, a new approach must be used to ensure the symbol definition information accessed by the utilities and the application programs are current and not stale.

As will be discussed, the present invention provides a method and apparatus for providing access to symbol definitions in a dynamically configurable operation system, in particular, a dynamically configurable kernel of the UNIX ® system.

For further description of the UNIX ® system including the kernel, see M. J. Bach, *The Design of the UNIX ® Operating System*, Prentice Hall, 1986.

SUMMARY OF THE INVENTION

A method and apparatus for providing access to symbol definitions in a dynamically configurable operating system is disclosed. The method and apparatus has particular application to operating systems, including the kernel of the UNIX ® system.

Under the present invention, an operating system symbol definition image file builder is provided to the operating system of a computer system. The builder is invoked to build a symbol definition image file comprising current symbol definitions in the operating system whenever a utility or an application program requests to open the symbol definition image file, and there is not an up-to-date system definition image file, thereby ensuring the symbol definitions included in the symbol definition image file provided to the utility/application program are current. The builder deletes the symbol definition image file whenever the symbol definition image file is closed by the last referencing utility/application program, and the system definition image file is no longer up-to-date.

Before building the symbol definition image file, the builder inhibits automatic unloading of the loaded relocatable segments of the operating system, thereby protecting the current symbol definitions included in the symbol definition image file from getting stale. The builder reactivates automatic unloading when it determines that no system definition image file is being referenced by any utility/application program. The builder makes the determination when a system definition image file is closed by a utility/application program.

Under the presently preferred embodiment, the symbol definition image file comprises a combined symbol table and a combined string table. The builder builds the combined symbol table and the combined string table by extracting symbol definition entries and string entries from the root executable segment and each currently loaded relocatable segment of the operating system, and merging them into the corresponding tables.

BRIEF DESCRIPTION OF THE DRAWINGS

The objects, features, and advantages of the present invention will be apparent from the following detailed description of the preferred embodiment of the invention with references to the drawings in which.

NOTATIONS AND NOMENCLATURE

Figure 1:
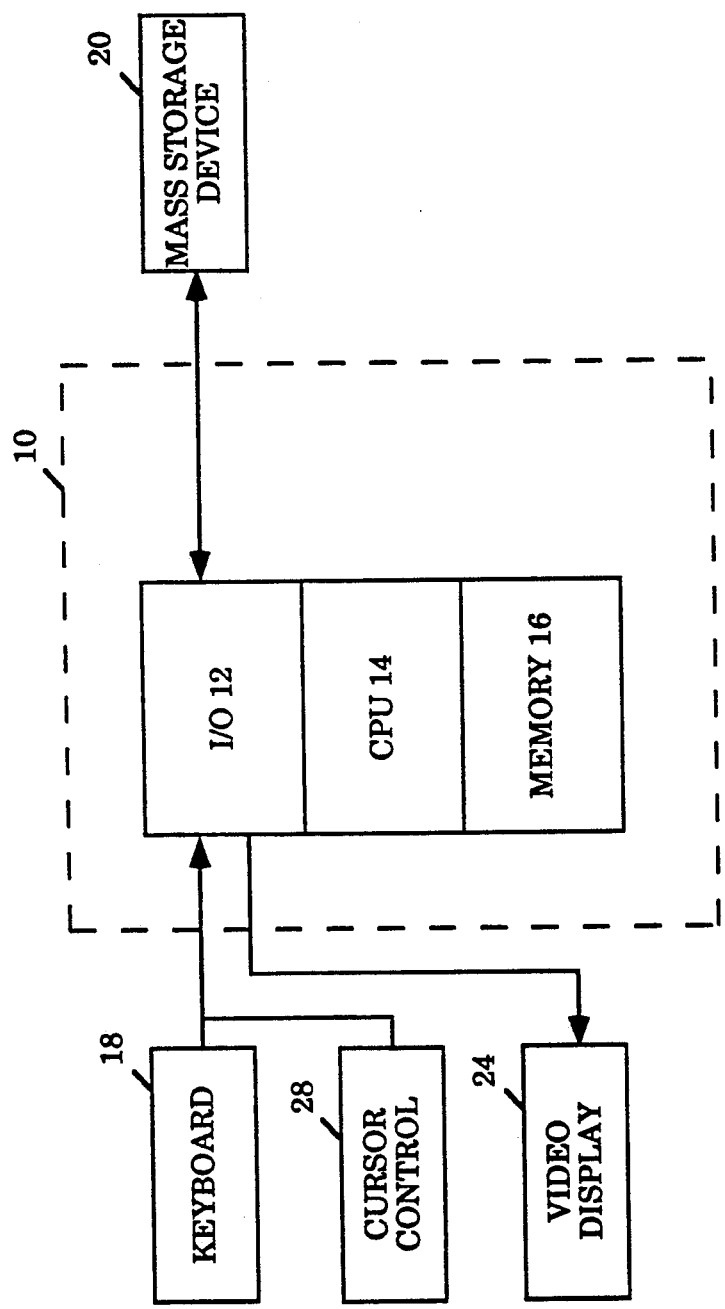
FIG. 1 shows a physical view of the hardware elements of a computer system that incorporates the teachings of the present invention.

The detailed description which follows is presented largely in terms of program procedures executed on a computer. These procedural descriptions and representations are the means used by those skilled in the art to most effectively convey the substance of their work to others skilled in the art.

A procedure is here, and generally, conceived to be a self-consistent sequence of steps leading to a desired result. These steps are those that require physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, objects, characters, terms, numbers, or the like. It should be borne in mind, however, that all these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operation described herein which form part of the present invention; the operations are machine operations. Useful machines for performing the operations of the present invention include general purpose digital computers or other similar devices. In all cases, it should be borne in mind the distinction between the method operations in operating a computer and the method of computation itself. The present invention relates to method steps for operating a computer in processing electrical or other physical signals to generate other desired physical signals.

The present invention also relates to apparatus for performing these operations. This apparatus may be specially constructed for the required purposes or it may comprise a general purpose computer as selectively activated or re-configured by a computer program stored in the computer. The procedures presented herein are not entirely related to any particular computer or other apparatus. In particular, various general purpose machines may be used with procedures written in accordance with the teaching herein, or it may prove more convenient to construct more specialized apparatus to perform the required method steps. The required structure for a variety of these machines will appear from the description given below.

DETAILED DESCRIPTION OF THE PREFERRED EMBODIMENT

A method and apparatus for providing access to current symbol definitions of a dynamically configured operating system is disclosed. The method and apparatus has particular applications to operating systems, including the kernel of the UNIX ® system. In the following description, for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Referring now to FIG. 1, a computer system that incorporates the teachings of the present invention is illustrated. Shown is a computer 10 which comprises three major components 12, 14, and 16. The first of these is an input/output (I/O) circuit 12 which is used to communicate information in appropriately structured form to and from other portions of the computer 10. In addition, the computer 10 includes a central processing unit (CPU) 14 coupled to the I/O circuit 12, and a memory 16. The I/O circuit 12, the CPU 14 and the memory 16 are those typically found in most general purpose computers.

A magnetic disk 20 is shown coupled to the I/O circuit 12 to provide additional storage capability for the computer 10. It will be appreciated that additional devices may be coupled to the computer 10 for storing data such as magnetic tape drives, as well as networks which are in turn coupled to other computer systems. As is well known, the disk 20 may store other computer programs, characters, routines, etc., which may be accessed and executed by the CPU 14.

A raster display monitor 24 is shown coupled to the I/O circuit 12 and is used to display images generated by the CPU 14 in accordance to the teachings of the present invention. Any well known variety of raster displays may be utilized as display 24. A keyboard 18 is shown coupled to the I/O circuit 12 and is used to input data and commands into the couputer 10, as is well known. A cursor control device 28 is also shown coupled to the computer 10 through the I/O circuit 12. Any well known variety of cursor control devices may be utilized as cursor control device 28.

In fact, the several hardware elements illustrated are intended to represent a broad category of computer systems. Particular examples include computer systems manufactured by Sun Microsystems, Inc. of Mountain View, Calif. Other computer systems having like capabilities may of course be adapted in a straight forward manner to perform the functions described below.

Figure 2:
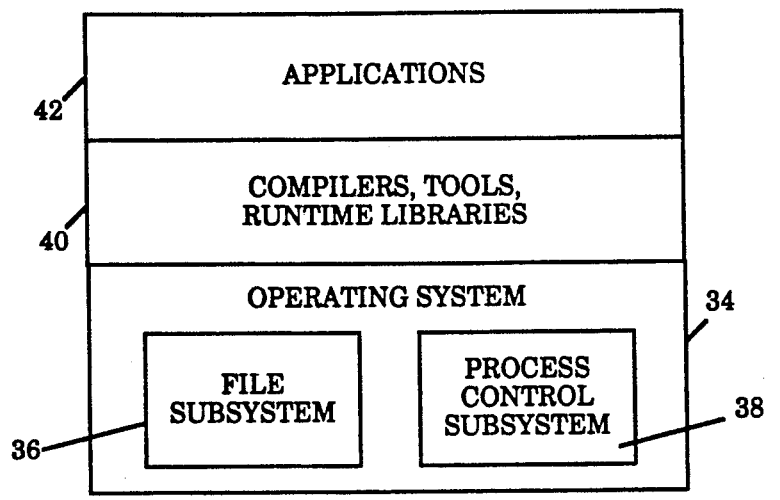
FIG. 2 shows a logical view of the software elements of the computer system illustrated in FIG. 1.

Referring now to FIG. 2, a block diagram illustrating a logical view of the software elements of the computer system illustrated in FIG. 1 is shown. Shown is an operating system 34 comprising a file subsystem 36 and a process control subsystem 38. The file subsystem 36 is responsible for managing files, allocating file spaces, administering free space, controlling access to files and retrieving data from files. The process control subsystem 38 is responsible for process synchronization, interprocess communication, memory management and process scheduling.

In its presently preferred form, the operating system is dynamically configured. The dynamically configured operating system is intended to represent a broad category of dynamically configured operating systems. The functions and program segment structure of the operating system will be described in further detail below with references to FIG. 3. However, it will be appreciated that the operating system may be statically configured as a pre-built single executable image.

Also shown are programming language compilers, software tools/utilities and their runtime libraries 40 for application development and execution. The applications 42 executing on the computer system utilize the underlying system services offered by runtime libraries 40 and the operating system 34. These software elements are those typically found in most general purpose computer systems and almost all special purpose computer systems.

Figure 3:
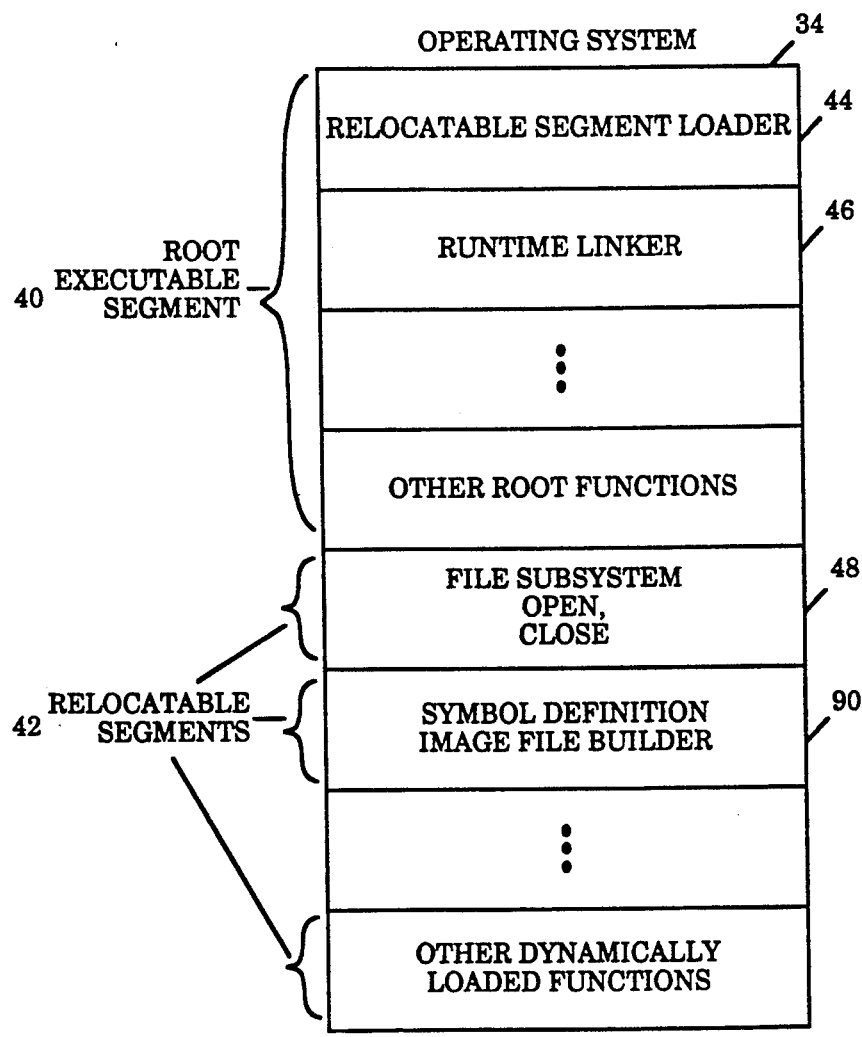
FIG. 3 illustrates a logical view of the functions and the program structure of the operating system illustrated in FIG. 2.

Referring now to FIG. 3, a block diagram illustrating a logical view of functions and the program segment structure of the operating system illustrated in FIG. 2 is shown. The functions of the dynamically configurable operating system 34 are distributed in a root executable segment 40, and a number of dynamically loaded and linked relocatable segments 42. The root executable segment 40 is loaded and given control during system start up. The other relocatable segments are dynamically loaded and linked when their functions are needed. In the event of memory constraint, some dynamically loaded and linked relocatable segments are unloaded (overlaid) if their functions have not been used recently.

The functions offered by the root executable segment 40 comprise a relocatable segment loader 44 and a runtime linker 46. The relocatable segment loader 44 is used for dynamically loading the relocatable segments when their functions are needed. The runtime linker 46 is used for dynamically linking a dynamically loaded relocatable segment into the current process image of the operating system. The functions offered by the relocatable segments comprise a file subsystem 48 that provides file opening and closing system services, and a symbol definitions builder 90 for building a symbol definition file comprising current symbol definitions of the operating system. The file opening system service includes access control.

The functions and the basic contributions of the relocatable segment loader 44, the runtime linker 46, and the file subsystem 48 are well known and will not be described further. The symbol definitions builder 90 and the symbol definition file will be discussed in further detail later with references to FIGS. 6 through 8.

It will be appreciated that the present invention may be practiced with a dynamically configurable operating system having function distributions and program segment structures that are different but essentially equivalent to the descriptions provided above.

Figures 4, 5:
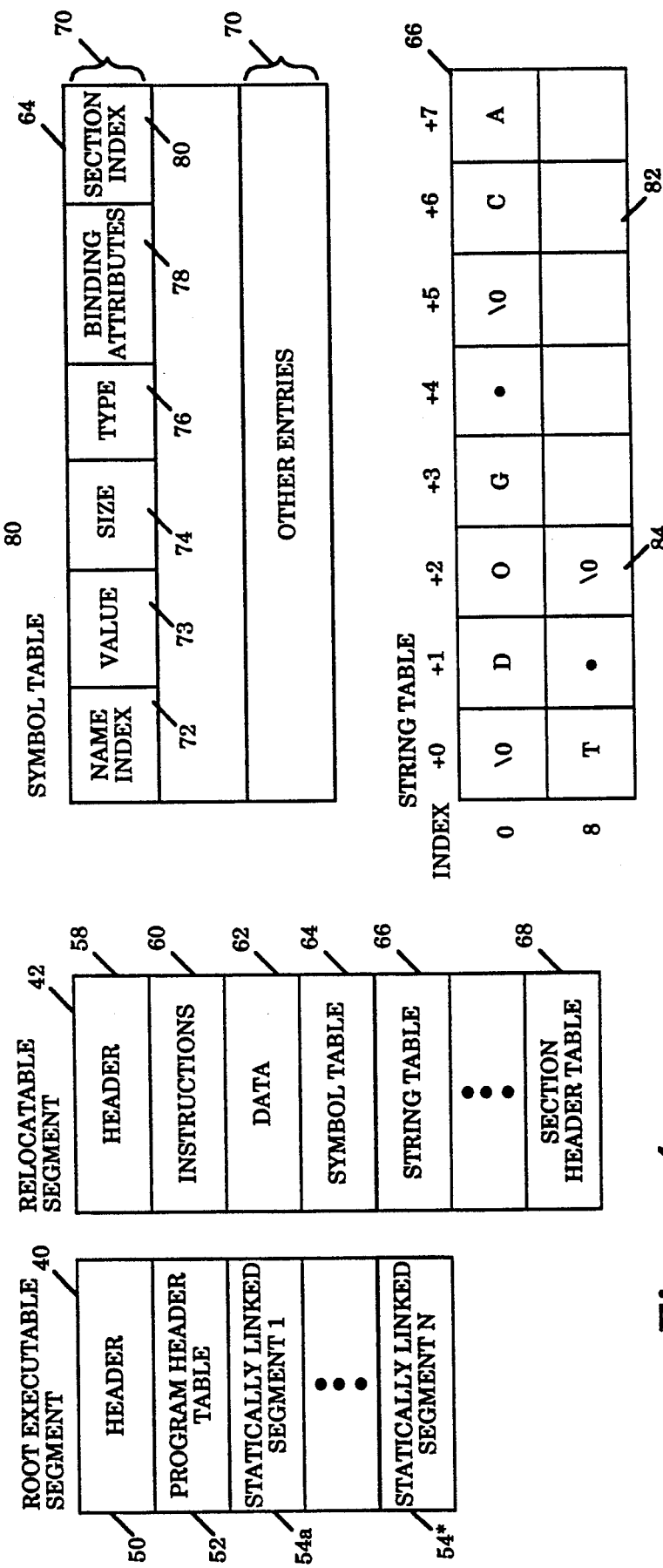
FIG. 4 illustrates the file formats of the root executable segment and the relocatable segments of the operating system illustrated in FIG. 3.
FIG. 5 illustrates the symbol table and the string table in the program segments illustrated in FIG. 4.

Referring now to FIG. 4, a block diagram illustrating the file formats for the root executable segment and the relocatable segments in their presently preferred form is shown. Shown is the root executable segment 40 comprising a file header 50, a program header table 52, and a number of statically linked segments 54a-54*. The file header 50 describes the file's organization. The program header table 52 describes how to create the process image. Each statically linked segment 54a, ..., or 54* comprises one or more sections which are similar to the sections in a relocatable segment described below.

Also shown is a relocatable segment 42 comprising a file header 58, an instruction section 60, a data section 62, a symbol table section 64, a string table section 66, and a section header table 68. Similarly, the file header 58 describes the file's organization. The instruction and data sections 60 and 62 comprise the program segment's instructions and data respectively. The symbol and string table sections 64 and 66 describe the symbol definitions of the program segment. The section header table 68 provides entries pointing to the various sections.

For further descriptions of the various elements of the root executable segment and the relocatable segments, see UNIX ® *System V Release 4 Programmer's Guide: ANSI C and Programming Supporting Tools*, UNIX Press, 1990, pp. 13-1 through 13-69.

Similarly, it will be appreciated that the present invention may be practiced with root executable and relocatable segments having file formats that are different but essentially equivalent to the descriptions provided above.

Referring now to FIG. 5, a block diagram illustrating a symbol table, and a string table in their presently preferred embodiment is shown. Shown is a symbol table 64 comprising a number of symbol definition entries 70. Each symbol definition entry 70 comprises a name index field 72, a value field 73, a size field 74, a type field 76, a binding attribute field 78, and a section index field 80. The name index field 72 contains a name index pointing to an offset into the string table where the first character of the symbol name is located. The value field 73 contains a value representing the address of the memory object the symbol refers to. The size field 74 contains a value describing the symbol size. The type field 76 contains an indicator identifying the symbol type. The binding attribute field 78 contains a number of symbol binding attributes. The section index field 80 contains a value pointing to a section header table entry in the section header table identifying the section the symbol is affiliated with.

Also shown is a string table 66 comprising a number of data bytes 82. Each data byte contains a character including the null character delimiting the strings. The data bytes are accessed as offsets into the string table 66 as illustrated. For example, the first character of the symbol "CAT." is located in the data byte with an offset of "6" into the string table 66.

For further descriptions of the symbol table and the string table, also see UNIX ® *System V Release 4 Programmer's Guide: ANSI C and Programming Supporting Tools*, UNIX Press, 1990, pp. 13-1 through 13-69.

Likewise, it will be appreciated that the present invention may be practiced with root executable and relocatable segments having symbol and string tables that are different but essentially equivalent to the descriptions provided above.

Figure 6:
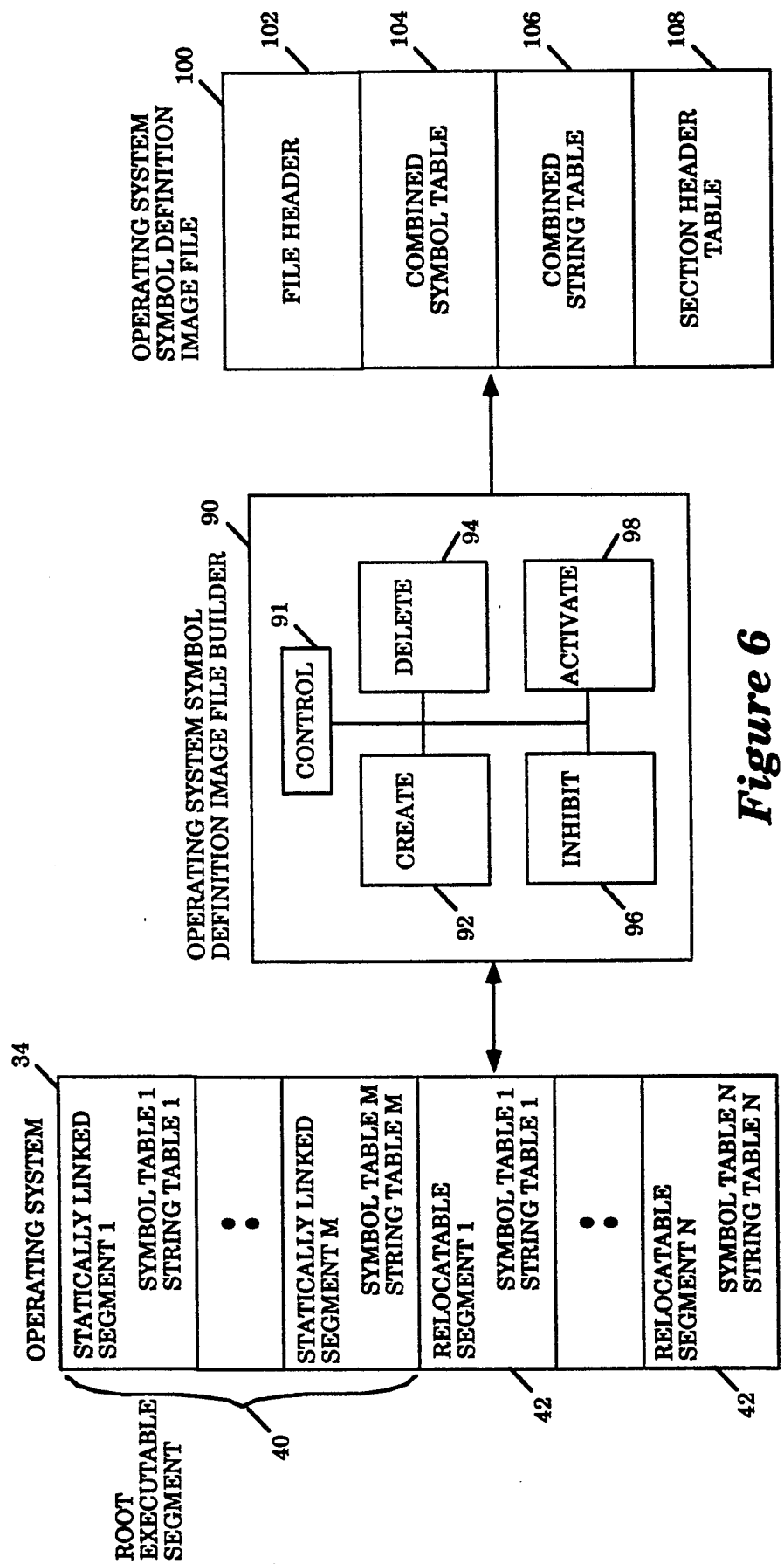
FIG. 6 illustrates the system definition image file builder and the symbol definition image file of the present invention in their presently preferred form.

Referring now to FIG. 6, a block diagram illustrating the symbol definition image file builder and the symbol definition image file in their presently preferred form is shown. Shown is the symbol definition image file builder 90 comprising a control routine 91, a create routine 92, a delete routine 94, an inhibit routine 96 and an activate routine 98. The control routine 91 is used for controlling of the invocation of the other routines 92-98. The create and delete routines 92 and 94 are used for creating and deleting a symbol definition image file 100. The inhibit and activate routines 96 and 98 are used for inhibiting and reactivating automatic relocatable segment unloading. The operating flow of these routines will be described in further detail later.

Also shown is a symbol definition image file 100 created by the symbol definition image file builder 90. The symbol definition image file 100 comprises a file header 102, a combined symbol table section 104, a combined string table section 106 and a section header 108. Similar to the file formats for the root executable segment and the relocatable segments of the operating system, the file header 102 describes the symbol definition image file's organization. The combined symbol table 104 and the combined string table 106 comprise all current symbol definitions and strings of the operating system respectively. The combined symbol table 104 and the combined string table 106 have the same organization as the individual symbol and string tables described earlier. Likewise, the section header table 108 comprises similar section entries pointing to the combined symbol table 104 and the combined string table 106.

Figure 7:
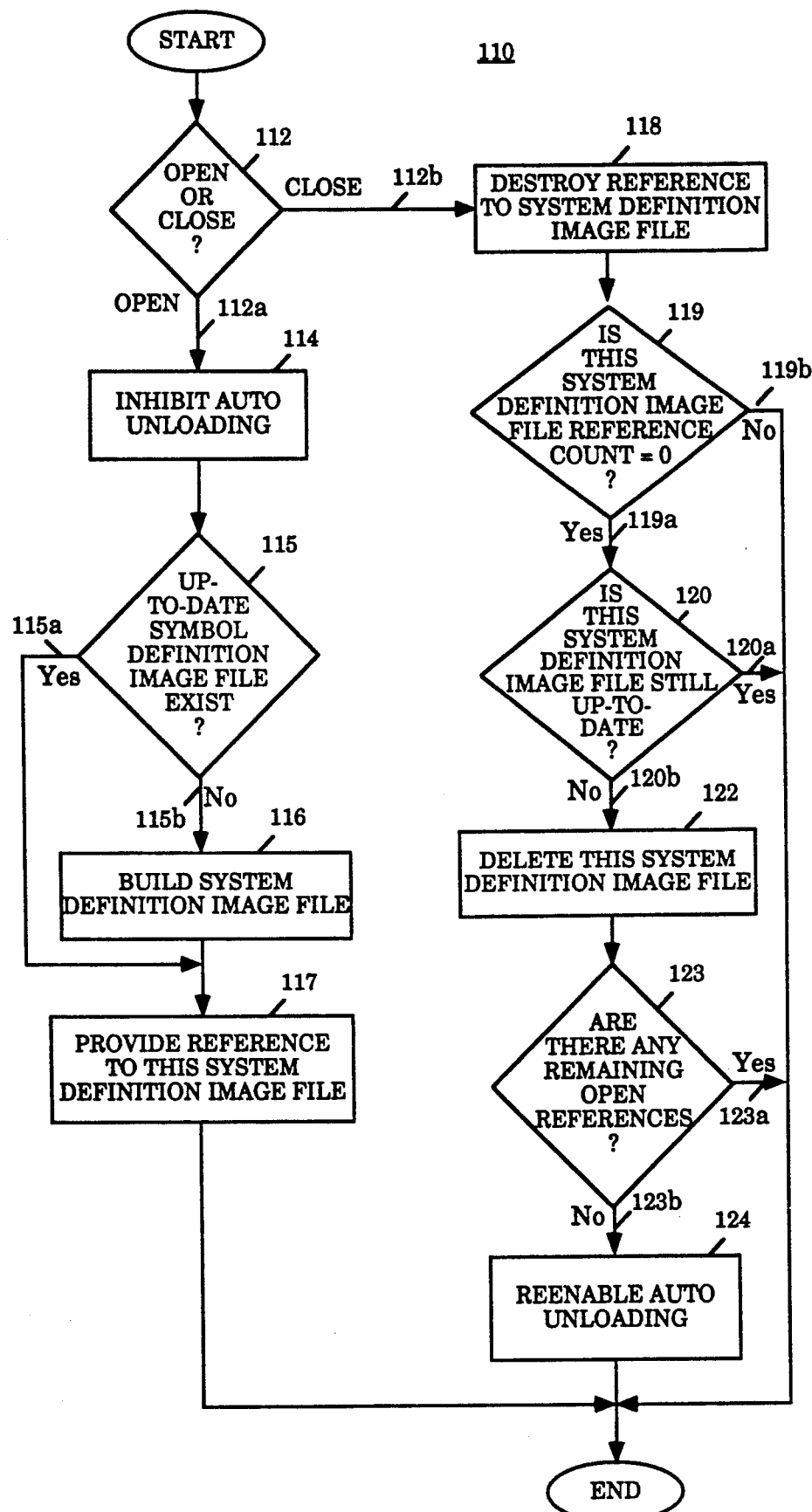
FIGS. 7 and 8 illustrate the operation flow of the functions of the system definitions builder of the present invention in their presently preferred form.
Figure 8:
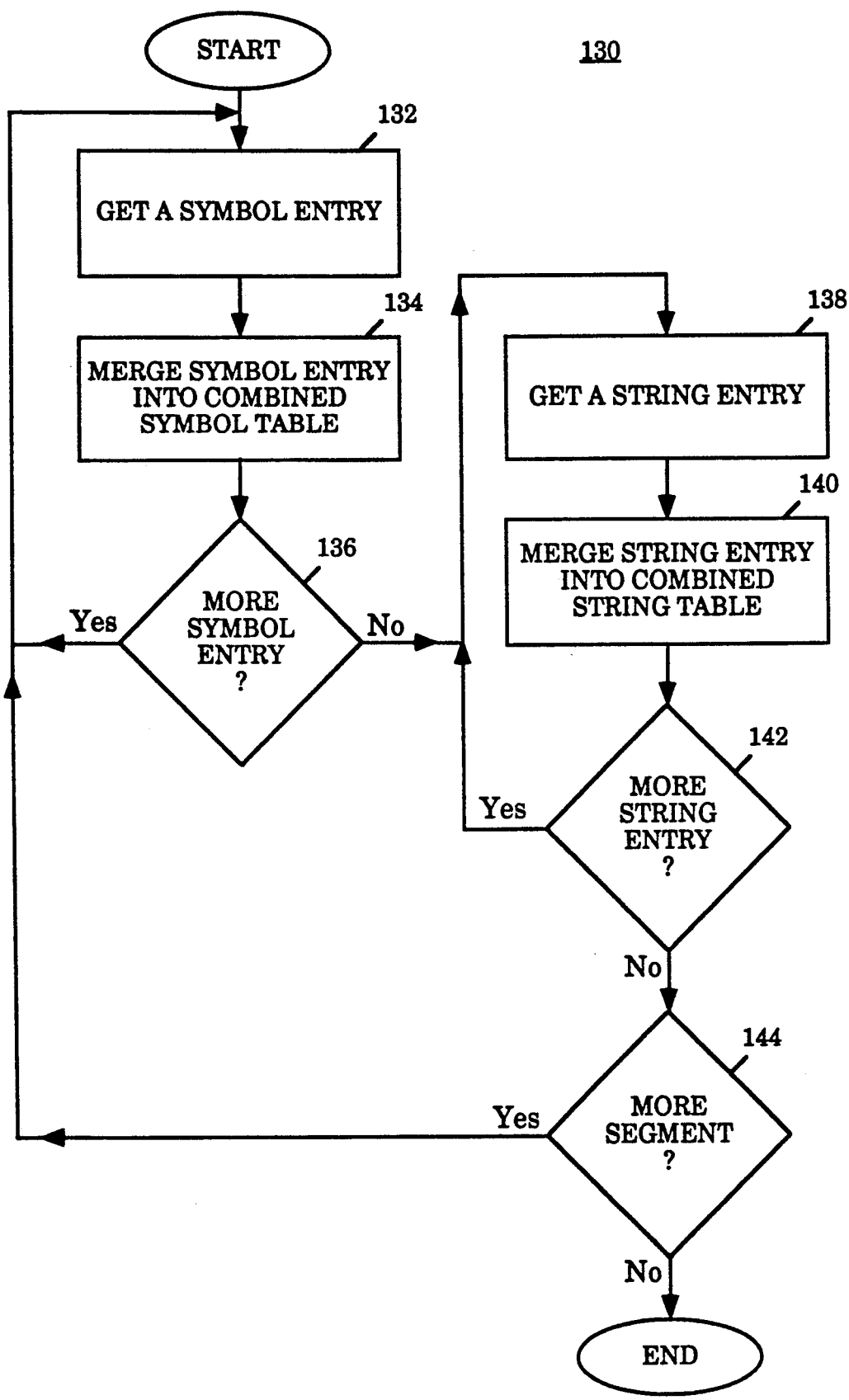

Referring now to FIGS. 7 and 8, two block diagrams illustrating the operation flow of the routines of the symbol definition image file builder in its presently preferred form are shown. As shown in FIG. 7, initially the control routine determines whether a request from a utility or application program is an open or close request, block 112. If the request is to open the symbol definition image file, branch 112a, the control routine invokes the inhibit function to inhibit automatic unloading of the relocatable segments currently in memory, block 114, thereby preventing the symbol definitions that are going to be included in the symbol definition image file from becoming stale.

The control routine then determines if an up-to-date symbol definition image file exists, block 115. If an up-to-date symbol definition image file does not exist, branch 115b, the control routine invokes the create function to create the symbol definition image file, block 116. After establishing the up-to-date symbol definition image file, to the control routine provides reference to this symbol definition image file to the requesting utility/application program, block 117. In its presently preferred form, the control routine also keeps track of the number of utilities/application programs currently referencing a symbol definition image file by incrementing an internal reference count for each symbol definition image file.

If the request is to a close symbol definition image file, branch 112b, the control routine destroys the reference being made by the requesting utility/application program to the symbol definition image file, block 118. Additionally, the control routine determines if the symbol definition image file's reference count is zero, block 119. If the reference count is non-zero, block 119b, the control routine takes no further action.

If the reference count is zero, branch 119a, the control routine further determines if the symbol definition image file is still up-to-date, block 120. If the symbol definition image file is up-to-date, branch 120a, the control routine takes no further action, otherwise, branch 120b, the control routine invokes the delete function to delete the symbol definition image file, block 122.

Upon deleting the symbol definition image file, the control routine further determines if there are any remaining references to any symbol definition image files, block 123. If there are remaining references, branch 123a, the control routine takes no further action, otherwise, branch 123b, the control routine invokes the activate function to reactivate automatic unloading of the relocatable segments currently in memory, block 124.

As shown in FIG. 8, when the create function is invoked, it locates the root executable program segment, retrieves all symbol entries from the symbol table of the program segment and merges them into the combined symbol table one at a time until all symbol table entries have been retrieved and merged, blocks 132-136. Similarly, the create function then retrieves all string entries from the string table of the root executable program segment and merges them into the combined string table one at a time until all string table entries have been retrieved and merged, blocks 138-142. Blocks 132-142 are then repeated for each program segment that is currently loaded in memory.

While the present invention has been described in terms of a presently preferred embodiment, those skilled in the art will recognize that the invention is not limited to the embodiment described. The method and apparatus of the present invention can be practiced with modification and alteration within the spirit and scope of the appended claims. The description is thus to be regarded as illustrative instead of restrictive on the present invention.

What is claimed is:

1. In a computer system comprising a central processing unit (CPU) executing an operating system and an application program loaded in a memory coupled to said CPU, wherein said operating system is dynamically configurable, a method for providing access to said application program to current symbol definitions of said operating system, said method comprising the steps of:

receiving an open request by said operating system to open a file containing current symbol definitions of said operating system from said application program;

inhibiting automatic unloading by said operating system of any relocatable segments of said operating system that are currently loaded in said memory, said dynamically configurable operating system comprising a root executable segment and a plurality of relocatable segments that are loaded and linked by said operating system on an as needed basis, said dynamically loaded and linked relocatable segments being automatically unloaded by said operating system when they are not being used;

creating said file by said operating system based on symbol definitions contained in said root executable segment and said relocatable segments that are currently loaded in memory; and making said file available by said operating system to said application program.

2. The method as set forth in claim 1, wherein, said method further comprises the steps of:

receiving a close request from said requestor to close said file;

making said file unavailable to said requestor;

determining if said file is still being referenced by at least one other requestor;

determining if said file still contains current symbol definitions of said operating system if said file is not being referenced by any other requestors;

deleting said file if said file does not contain said current symbol definitions of said operating system;

determining if there is still at least one other reference to one other file containing symbol definitions of said operating system; and reactivating automatic unloading of said relocatable segments that are currently loaded in said memory if it is determined that there is no said at least one other reference.

3. The method as set forth in claim 1, wherein, said step of creating said file based on symbol definitions contained in said root executable segment and said relocatable segments that are currently loaded in memory comprises the steps of:

extracting symbol table entries from a symbol table of said root executable segment;

merging said symbol table entries into a combined symbol table;

extracting string table entries from a string table of said root executable segment; and merging said string table entries into a combined string table.

4. The method as set forth in claim 3, wherein, said extracting and merging steps are repeated for each of said relocatable segments that is currently loaded into said memory.

5. The method as set forth in claim 3, wherein, each of said symbol table entries comprises a name index pointing to an offset into the corresponding string table where a symbol name is located, a symbol value representing an address of a memory object, a symbol size, a symbol type, at least one binding attribute, and a section index pointing to an offset into a section header table where a section name is located, said memory object being referenced by said symbol name, said section name being affiliated with said symbol name.

6. The method as set forth in claim 3, wherein, each of said string table entries comprises at least one null terminated character starting at an offset into said string table.

7. A computer system comprising:
a central processing unit (CPU);
a memory coupled to said CPU;
an application program loaded in said memory being executed by said CPU;
an operating system loaded in said memory being executed by said CPU that is dynamically configurable, said operating system having
a file subsystem providing file subsystem services for opening and closing files, and
an operating system symbol definition file builder for dynamically building a file of current symbol definitions of said operating system for said application program at said application program's request.

8. The computer system as set forth in claim 14, wherein,
said file subsystem comprises
a receive interface for receiving an open request to open a file containing current symbol definitions of said operating system from an executing application program,
an access control routine for making said file available to said application program; and
said operating system symbol definition image file builder comprises
an inhibition routine for inhibiting automatic unloading of any relocatable segments of said operating system by said operating system that are currently loaded in said memory, said dynamically configurable operating system comprising a root executable segment and a plurality of relocatable segments that are loaded and linked by said operating system on an as needed basis, said dynamically loaded and linked relocatable segments being automatically unloaded by said operating system when they are not being used;
a file creation routine for creating said file based on symbol definitions contained in said root executable segment and said relocatable segments that are currently loaded in memory.

9. The computer system as set forth in claim 8, wherein,
said receive interface is also used for receiving a close request to close said file comprising current symbol definitions of said operating system;
said file subsystem further comprises a file deletion routine for deleting said file; and
said operating system symbol definition image file builder further comprises an activation routine for reactivating automatic unloading by said operating system of said relocatable segments that are currently loaded in said memory.

10. The computer system as set forth in claim 8, wherein, said file creation routine creates said file based on symbol definitions contained in said root executable segment and said relocatable segments that are currently loaded in memory by:
extracting symbol table entries from a symbol table of said root executable segment;
merging said symbol table entries into a combined symbol table;
extracting string table entries from a string table of said root executable segment; and
merging said string table entries into a combined string table.

11. The computer system as set forth in claim 10, wherein, said file creation routine repeats said extracting and merging for each of said relocatable segments that is currently loaded into said memory.

12. The computer system as set forth in claim 10, wherein, each of said symbol table entries comprises a name index pointing to an offset into the corresponding string table where a symbol name is located, a symbol size, a symbol type, at least one binding attribute, and a section index pointing to an offset into a section header table where a section name is located, said symbol name being affiliated with said symbol name.

13. The computer system as set forth in claim 10, wherein, each of said string table entries comprises at least one null terminated character starting at an offset into said string table.

* * * * *

UNITED STATES PATENT AND TRADEMARK OFFICE
CERTIFICATE OF CORRECTION

PATENT NO. : 5,303,392

DATED : April 12, 1994

INVENTOR(S) : Carney et al.

It is certified that error appears in the above-identified patent and that said Letters Patent is hereby corrected as shown below:

In column 9, claim 8 at line 24, please delete " 14 " and insert -- 7--.

Signed and Sealed this

Twenty-third Day of December, 1997

Attest:

BRUCE LEHMAN

Attesting Officer

Commissioner of Patents and Trademarks